(12) United States Patent
Zhang et al.

(10) Patent No.: US 11,879,638 B2
(45) Date of Patent: Jan. 23, 2024

(54) BOILER

(71) Applicant: IHI Corporation, Tokyo (JP)

(72) Inventors: Juwei Zhang, Tokyo (JP); Takamasa Ito, Tokyo (JP); Sakiko Ishihara, Tokyo (JP)

(73) Assignee: IHI Corporation, Tokyo (JP)

( * ) Notice: Subject to any disclaimer, the term of this patent is extended or adjusted under 35 U.S.C. 154(b) by 402 days.

(21) Appl. No.: 17/155,355

(22) Filed: Jan. 22, 2021

(65) Prior Publication Data

US 2021/0140629 A1 May 13, 2021

Related U.S. Application Data

(63) Continuation of application No. PCT/JP2019/035619, filed on Sep. 11, 2019.

(30) Foreign Application Priority Data

Sep. 11, 2018 (JP) ................................. 2018-169588

(51) Int. Cl.
*F23J 7/00* (2006.01)
*F22B 37/00* (2006.01)
*F23C 1/00* (2006.01)

(52) U.S. Cl.
CPC ............... *F23J 7/00* (2013.01); *F22B 37/008* (2013.01); *F23C 1/00* (2013.01); *F23C 2900/06041* (2013.01)

(58) Field of Classification Search
CPC ............ F23J 7/00; F22B 37/008; F23C 1/00
See application file for complete search history.

(56) References Cited

U.S. PATENT DOCUMENTS

| | | | | |
|---|---|---|---|---|
| 4,335,084 A * | 6/1982 | Brogan | .................. | B01D 53/56 110/345 |
| 5,681,158 A * | 10/1997 | Knapp | ...................... | F23L 7/00 431/5 |
| 5,756,059 A * | 5/1998 | Zamansky | .................. | F23J 7/00 423/239.1 |
| 5,820,838 A * | 10/1998 | Tsuo | ...................... | B01D 53/56 423/235 |
| 6,453,830 B1 * | 9/2002 | Zauderer | .................. | F23D 1/005 110/348 |
| 6,973,883 B1 * | 12/2005 | Annamalai | ........... | F23D 17/005 110/345 |
| 2004/0067460 A1 * | 4/2004 | Monro | ...................... | F23L 7/00 431/9 |

(Continued)

FOREIGN PATENT DOCUMENTS

| CN | 107543148 A | 1/2018 |
|---|---|---|
| CN | 107559858 A | 1/2018 |

(Continued)

*Primary Examiner* — David J Laux

(74) *Attorney, Agent, or Firm* — Oblon, McClelland, Maier & Neustadt, L.L.P.

(57) ABSTRACT

A boiler performs mixed-fuel combustion of a sulfur-containing fuel and ammonia as a fuel, and includes a furnace having a plurality of wall parts, a burner installed on at least one of the wall parts of the furnace, and an ammonia injection port that is configured to cause the ammonia to be burned as the fuel to flow along an inner wall surface of the wall part where the burner is not installed.

5 Claims, 3 Drawing Sheets

(56) References Cited

U.S. PATENT DOCUMENTS

| | | | |
|---|---|---|---|
| 2004/0185402 A1* | 9/2004 | Moberg | F23C 5/32 |
| | | | 431/9 |
| 2010/0203461 A1* | 8/2010 | Maly | F23C 6/045 |
| | | | 431/9 |
| 2011/0142739 A1* | 6/2011 | Swanson | B01D 53/56 |
| | | | 423/235 |
| 2013/0142719 A1 | 6/2013 | Kai et al. | |
| 2015/0241058 A1 | 8/2015 | Mine et al. | |
| 2017/0114999 A1* | 4/2017 | Giraud | F27B 9/10 |
| 2020/0003420 A1 | 1/2020 | Ito et al. | |

FOREIGN PATENT DOCUMENTS

| | | |
|---|---|---|
| EP | 2 862 621 A1 | 4/2015 |
| JP | 7-310903 A | 11/1995 |
| JP | 2012-35216 A | 2/2012 |
| JP | 2014-522 A | 1/2014 |
| JP | 2014-55759 A | 3/2014 |
| JP | 2016-32391 A | 3/2016 |
| JP | 6296216 B1 | 3/2018 |
| JP | 6332578 B1 | 5/2018 |
| JP | 2018-138863 A | 9/2018 |
| JP | 2018-162724 A | 10/2018 |
| JP | 2018-173177 A | 11/2018 |
| JP | 2018-200144 A | 12/2018 |
| JP | 2019-86189 A | 6/2019 |
| JP | 2019-86191 A | 6/2019 |
| WO | WO 2012/020557 A1 | 2/2012 |
| WO | WO 2013/191053 A1 | 12/2013 |

* cited by examiner

BOILER

CROSS-REFERENCE TO RELATED APPLICATIONS

This application is a Continuation Application based on International Application No. PCT/JP2019/035619, filed on Sep. 11, 2019, which claims priority on Japanese Patent Application No. 2018-169588, filed Sep. 11, 2018, the contents of which are incorporated herein by reference.

TECHNICAL FIELD

The present disclosure relates to a boiler.

BACKGROUND

Patent Document 1 below discloses a complex energy system that burns a fuel containing ammonia. In order to reduce a discharge amount of carbon dioxide, the complex energy system adds ammonia to natural gas serving as a main fuel and burns the fuel containing ammonia.

DOCUMENT OF RELATED ART

Patent Document

[Patent Document 1] Japanese Unexamined Patent Application, First Publication No. 2016-032391

SUMMARY

When a substance containing a sulfur component such as natural gas or pulverized coal is burned as a fuel, corrosive hydrogen sulfide ($H_2S$) is generated. When a furnace is exposed to the generated hydrogen sulfide for a long period of time, corrosion of the furnace gradually progresses, and accordingly it is necessary to carry out regular maintenance work for a boiler. In particular, in a case of adopting a two-stage combustion method in which an unburned fuel is re-burned in an upper part of the furnace, as a reduction region having a high fuel concentration is formed in a main combustion region in a central part of the furnace and a large amount of hydrogen sulfide is generated in the main combustion region, the corrosion may progress.

The present disclosure is made in view of the above-described problems, and an object thereof is to suppress corrosion of a wall part of a furnace due to hydrogen sulfide in a boiler which perform mixed-fuel combustion of a fuel containing a sulfur component and an ammonia fuel.

An aspect of the present disclosure is a boiler which performs mixed-fuel combustion of a sulfur-containing fuel and ammonia as a fuel, and includes a furnace having a plurality of wall parts, a burner installed on at least one of the wall parts of the furnace, and an ammonia injection port that is configured to cause the ammonia to be burned as the fuel to flow along an inner wall surface of the wall part where the burner is not installed.

In the boiler according to the above-described aspect, the wall parts of the furnace may include a front wall on which the burner is installed, a rear wall on which the burner is installed, and which is disposed to face the front wall, and a side wall which connects the front wall and the rear wall to each other, and on which the burner is not installed, and the ammonia injection port may be provided on at least one of the front wall and the rear wall, and disposed closer to the side wall than the burner in a horizontal direction.

In the boiler according to the above-described aspect, the ammonia injection port may be configured to inject the ammonia in a direction in which the burner injects the fuel.

In the boiler according to the above-described aspect, the ammonia injection port may be further installed on the side wall.

In the boiler according to the above-described aspect, the wall parts of the furnace may include a hopper wall narrowed toward a discharge port through which ash is discharged outward, and the ammonia injection port may be configured to cause the ammonia to flow along an inner wall surface of the hopper wall.

According to the present disclosure, a portion of the ammonia to be burned as a fuel flows from the ammonia injection port along the inner wall surface of the wall part where the burner is not installed. Since the inner wall surface of the wall part where the burner is installed is maintained in a high oxygen concentration state by combustion air injected from the burner and a high reduction region is less likely to be formed thereon, the hydrogen sulfide concentration of this inner wall surface is relatively low, and this inner wall surface is less likely to be corroded. On the other hand, since the oxygen concentration of the inner wall surface of the wall part where the burner is not installed is relatively low and the hydrogen sulfide concentration thereof is relatively high, this inner wall is likely to be corroded. According to the present disclosure, the ammonia injected from the ammonia injection port is burned in the vicinity of the inner wall surface of the wall part where the burner is not installed, and many OH radicals are generated in the vicinity of this inner wall surface. As a result, an oxidation reaction of hydrogen sulfide is promoted in the vicinity of the inner wall surface of the wall part where the burner is not installed, and thus it is possible to suppress corrosion of this wall part due to the hydrogen sulfide. Therefore, according to the present disclosure, it is possible to suppress corrosion of the wall part of the furnace due to the hydrogen sulfide in the boiler which performs mixed-fuel combustion of a fuel containing a sulfur component and an ammonia fuel.

DESCRIPTION OF EMBODIMENTS

Hereinafter, an embodiment of a boiler according to the present disclosure will be described with reference to the drawings.

First Embodiment

Figure 1:
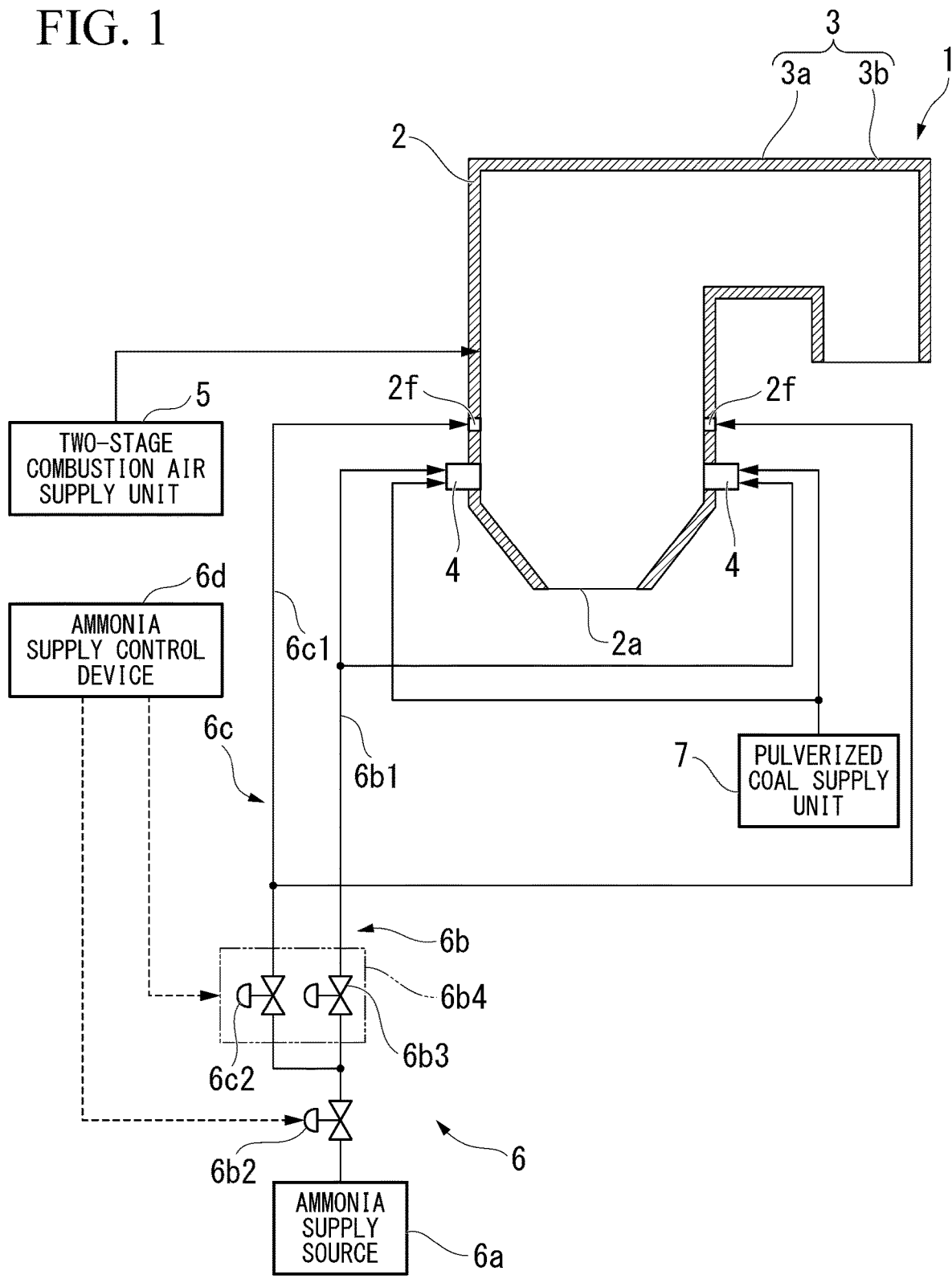
FIG. 1 is a schematic diagram showing a main part configuration of a boiler according to a first embodiment of the present disclosure.

FIG. 1 is a schematic diagram showing a main part configuration of a boiler 1 of a first embodiment. As illustrated in FIG. 1, the boiler 1 includes a furnace 2, a flue 3, burners 4, a two-stage combustion air supply unit 5, an ammonia supply unit 6, and a pulverized coal supply unit 7.

The furnace 2 is a furnace body configured to include a vertically and cylindrically provided furnace wall, and to burn a fuel such as ammonia and pulverized coal to generate combustion heat. In the furnace 2, high-temperature combustion gas is generated by burning the fuel. In addition, a bottom part of the furnace 2 is provided with a discharge port 2a through which ash generated by burning the fuel is discharged outward.

Figure 2:
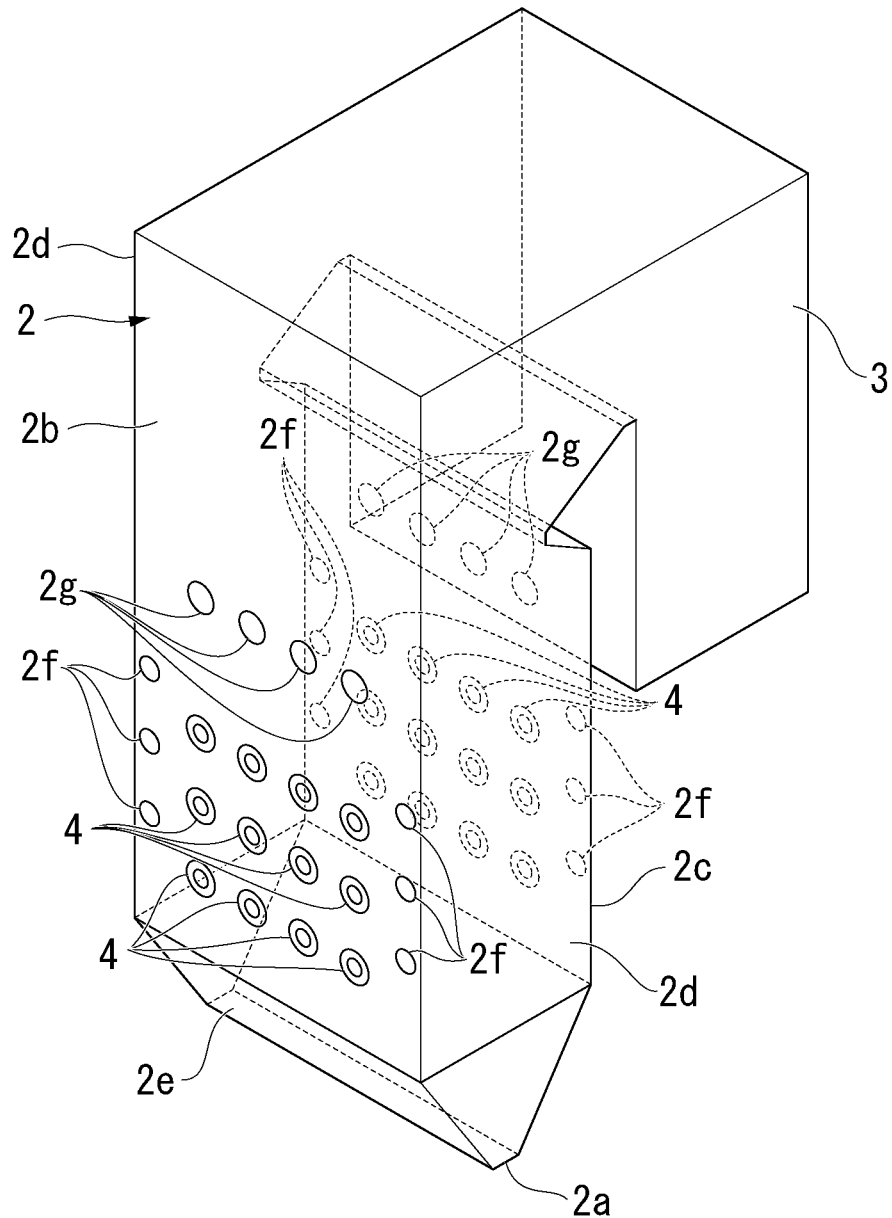
FIG. 2 is a schematic perspective view including a furnace for showing a disposition of a burner and an ammonia injection port which are included in the boiler according to the first embodiment of the present disclosure.

FIG. 2 is a schematic perspective view including the furnace 2 for showing a disposition of the burners 4 and ammonia injection ports 2f (to be described later). In FIG. 2, a double circle indicates a disposed position of the burner 4, and a small single circle indicates a disposed position of the ammonia injection port 2f (to be described later). In addition, a large single circle indicates a disposed position of a two-stage combustion air port 2g (to be described later).

As illustrated in FIG. 2, in the present embodiment, the furnace 2 has a hollow shape having a rectangular shape in a plan view, and has a front wall 2b, a rear wall 2c, side walls 2d, and a hopper wall 2e as wall parts. The front wall 2b is a wall part disposed on a front side of the furnace 2. The rear wall 2c is a wall part disposed on a rear side of the furnace 2, and is disposed to face the front wall 2b. The side wall 2d is a wall part that connects the front wall 2b and the rear wall 2c to each other. In the present embodiment, two side walls 2d are provided such that one side wall 2d connects one end of the front wall 2b in a horizontal direction and one end of the rear wall 2c in the horizontal direction to each other, and the other side wall 2d connects the other end of the front wall 2b in the horizontal direction and the other end of the rear wall 2c in the horizontal direction to each other. The hopper wall 2e includes inclined walls narrowed toward the discharge port 2a, and forms the bottom part of the furnace 2.

Among the wall parts included in the furnace 2, the front wall 2b and the rear wall 2c are wall parts where the burners 4 are installed. Among the wall parts included in the furnace 2, the side walls 2d and the hopper wall 2e are wall parts where the burner 4 is not installed. In the boiler 1 of the present embodiment, a plurality of ammonia injection ports 2f that inject the ammonia supplied from the ammonia supply unit 6 toward the inside of the furnace 2 are provided on the front wall 2b and the rear wall 2c which are the wall parts where the burners 4 are installed.

As illustrated in FIG. 2, the ammonia injection ports 2f provided on the front wall 2b are disposed closer to the side wall 2d than the burners 4 provided on the front wall 2b. That is, when viewed from one side wall 2d, the ammonia injection port 2f closest to the side wall 2d is disposed closer to the side wall 2d than the burner 4 closest to the side wall 2d. The ammonia injection port 2f injects the ammonia in an injection direction of the fuel injected from the burner 4, and causes the ammonia to flow along the inner wall surface of the side wall 2d. The ammonia injected from the ammonia injection port 2f is a portion of the ammonia to be originally supplied to the burner 4 as a fuel, and after being injected into the furnace 2, the ammonia is burned inside the furnace 2. As described above, in the boiler 1 of the present embodiment, the ammonia to be burned as a fuel is injected from the ammonia injection port 2f along the inner wall surface of the side wall 2d where the burner 4 is not provided.

Although the ammonia injection port 2f is illustrated in FIG. 1 to conceptually indicate that the ammonia injection port 2f is provided in the furnace 2, a position of the ammonia injection port 2f in FIG. 1 does not indicate a position where the ammonia injection port 2f is actually provided. Actually, as illustrated in FIG. 2, the ammonia injection port 2f is disposed between the burner 4 and the side wall 2d in the horizontal direction.

Referring back to FIG. 1, the flue 3 is connected to the upper part of the furnace 2, and guides the combustion gas generated in the furnace 2 to the outside as exhaust gas. The flue 3 includes a horizontal flue 3a extending horizontally from the upper part of the furnace 2, and a rear flue 3b extending downward from an end portion of the horizontal flue 3a.

Although omitted in FIG. 1, the boiler 1 includes a superheater installed in the upper part or the like of the furnace 2. The superheater generates steam by exchanging heat between the combustion heat generated in the furnace 2 and water. In addition, although omitted in FIG. 1, the boiler 1 may include a reheater, a fuel economizer, and an air preheater.

The burners 4 are disposed on the wall parts in the lower part of the furnace 2. A plurality of the burners 4 are installed in a circumferential direction of the furnace 2. In addition, although omitted in FIG. 1, a plurality of the burners 4 are also installed in a height direction of the furnace 2. The burners 4 are two-dimensionally disposed in the lower part of the furnace 2 and are disposed to face each other, and inject and burn the fuel. All of the burners 4 are composite burners that can inject the ammonia and the pulverized coal as a fuel into the furnace 2. Although omitted in FIG. 1, the furnace 2 is provided with an ignition device for igniting the fuel (ammonia and pulverized coal) injected into the furnace 2 from the burner 4. In addition, although omitted in FIG. 1, the boiler 1 has a combustion air supply unit that supplies combustion air to the burners 4. The fuel (ammonia and pulverized coal) injected from each of the burners 4 into the furnace 2 together with the combustion air is ignited and burned by an operation of the ignition device.

All of the burners 4 installed in the boiler 1 may not necessarily be the composite burners as described above. For example, a configuration including a coal single-fuel combustion burner may be adopted. However, the boiler 1 of the present embodiment is provided with at least one burner 4 that can burn the ammonia as a fuel such that the boiler 1 can perform mixed-fuel combustion of the ammonia and the pulverized coal inside the furnace 2.

Here, ammonia ($NH_3$) is a compound of hydrogen (H) and nitrogen (N) as expressed by a molecular formula, and does not contain carbon (C) as a constituent atom. In addition, the ammonia (low carbon fuel) is known as a flame-retardant substance, and is a hydrogen carrier substance having three hydrogen atoms as in methane ($CH_3$). The pulverized coal is obtained by crushing coal which is a fossil fuel to a size of approximately several micrometers, and is generally used as a fuel for the boiler. That is, the ammonia is a low carbon fuel having a lower carbon concentration than the pulverized coal (carbon fuel).

The two-stage combustion air supply unit 5 is connected to the furnace 2 above the burner 4, and supplies two-stage combustion air into the furnace 2. The two-stage combustion air is supplied by the two-stage combustion air supply unit 5, and an unburned portion of the fuel, which has not been burned by the burner 4, is burned by the two-stage combustion air. In this manner, heat collection performance of the boiler 1 can be improved, and the unburned portion of the fuel contained in the exhaust gas can be reduced.

The ammonia supply unit 6 includes an ammonia supply source 6a, a burner supply part 6b, a port supply part 6c, and an ammonia supply control device 6d. The ammonia supply source 6a includes a tank that stores the ammonia. The ammonia supply source 6a may not necessarily be a component of the ammonia supply unit 6. That is, the ammonia supply unit 6 may take in the ammonia from the ammonia supply source 6a installed outside.

The burner supply part 6b includes a burner supply pipe 6b1 that connects the ammonia supply source 6a and the burner 4 to each other, an overall flow rate adjustment valve 6b2 and a burner supply amount adjustment valve 6b3 which are installed in an intermediate part of the burner supply pipe 6b1. The burner supply pipe 6b1 guides a portion, which is to be supplied to the burner 4, of the ammonia supplied from the ammonia supply source 6a. The overall flow rate adjustment valve 6b2 controls an overall flow rate of the ammonia to be supplied from the ammonia supply source 6a to the burner supply pipe 6b1. The overall flow rate of the ammonia means a flow rate of the ammonia to be burned as a fuel. The burner supply amount adjustment valve 6b3 is disposed on the downstream side of the overall flow rate adjustment valve 6b2, and controls a flow rate of the ammonia to be supplied to the burner 4.

The port supply part 6c includes a port supply pipe 6c1 connected to the ammonia injection port 2f of the furnace 2, and a port supply amount adjustment valve 6c2 installed in an intermediate part of the port supply pipe 6c1. One end of the port supply pipe 6c1 is connected to the burner supply pipe 6b1 between the overall flow rate adjustment valve 6b2 and the burner supply amount adjustment valve 6b3. That is, the port supply pipe 6c1 connects the burner supply part 6b and the ammonia injection port 2f to each other, takes in a portion of the ammonia from the burner supply part 6b, and guides the portion of the ammonia to the ammonia injection port 2f. The port supply amount adjustment valve 6c2 controls a flow rate of the ammonia to be injected from the ammonia injection port 2f.

The ammonia supply control device 6d controls the overall flow rate adjustment valve 6b2, the burner supply amount adjustment valve 6b3, and the port supply amount adjustment valve 6c2 to adjust an opening degree of the overall flow rate adjustment valve 6b2, an opening degree of the burner supply amount adjustment valve 6b3, and an opening degree of the port supply amount adjustment valve 6c2. The ammonia supply control device 6d adjusts the opening degree of the overall flow rate adjustment valve 6b2, based on an external command or the like, thereby controlling the overall flow rate of the ammonia to be taken in from the ammonia supply source 6a.

In addition, distribution of the ammonia taken in from the ammonia supply source 6a to the burner 4 and the ammonia injection port 2f is determined by the opening degree of the burner supply amount adjustment valve 6b3 and the opening degree of the port supply amount adjustment valve 6c2. That is, the burner supply amount adjustment valve 6b3 and the port supply amount adjustment valve 6c2 form a mechanism (distribution adjustment mechanism 6b4) for adjusting a distribution ratio of the ammonia between the burner 4 and the ammonia injection port 2f. The ammonia supply control device 6d adjusts the distribution ratio of the ammonia to the burner 4 and the ammonia injection port 2f by controlling the distribution adjustment mechanism 6b4 including the burner supply amount adjustment valve 6b3 and the port supply amount adjustment valve 6c2.

The pulverized coal supply unit 7 is connected to the burner 4, crushes the coal into the pulverized coal, and supplies the pulverized coal to the burner 4. For example, the pulverized coal supply unit 7 includes a mill that crushes the coal to a particle size of approximately several micrometers to obtain the pulverized coal, and a coal feeder that supplies the pulverized coal produced by the mill to the burner 4. The pulverized coal supply unit 7 may be configured to supply the pulverized coal directly from the mill to the burner 4 without providing the coal feeder.

In the boiler 1 of the present embodiment, the ammonia is supplied from the ammonia supply unit 6 to the burner 4, and the pulverized coal is supplied from the pulverized coal supply unit 7 to the burner 4, thereby forming a flame by the burner 4 using the ammonia and the pulverized coal as a fuel. In addition, the two-stage combustion air is supplied into the furnace 2 by the two-stage combustion air supply unit 5, and the unburned fuel contained in the combustion gas is burned. The combustion gas generated by burning the fuel moves from the lower part to the upper part of the furnace 2, and is guided outward through the flue 3. In addition, in the boiler 1 of the present embodiment, the ammonia injected from the ammonia injection port 2f of the furnace 2 flows along the inner wall surface of the side wall 2d, and is burned in the vicinity of the inner wall surface of the side wall 2d.

In the boiler 1 of the present embodiment, the inner wall surfaces of the front wall 2b and the rear wall 2c where the burners 4 are installed are maintained in a high oxygen concentration state by the combustion air injected from the burner 4, and a high reduction region is less likely to be formed thereon. Therefore, the hydrogen sulfide concentration in the vicinity of the inner wall surfaces of the front wall 2b and the rear wall 2c is relatively lower than the hydrogen sulfide concentration in the vicinity of the inner wall surface of the side wall 2d, and the inner wall surfaces of the front wall 2b and the rear wall 2c are less likely to be corroded.

On the other hand, since the inner wall surface of the side wall 2d where the burner 4 is not installed is located far from the burner 4, the oxygen concentration is likely to be relatively lower and the hydrogen sulfide concentration is likely to be relatively higher in the vicinity of the inner wall surface of the side wall 2d. In the boiler 1 of the present embodiment, the ammonia injected from the ammonia injection port 2f is burned in the vicinity of the inner wall surface of the side wall 2d, and many OH radicals are generated in the vicinity of the inner wall surface of the side wall 2d. As a result, an oxidation reaction of hydrogen sulfide is promoted in the vicinity of the inner wall surface of the side wall 2d, and thus it is possible to suppress corrosion of the side wall 2d due to the hydrogen sulfide. That is, according to the boiler 1 of the present embodiment, it is possible to suppress corrosion of the wall part of the furnace 2 due to the hydrogen sulfide in a case of performing mixed-fuel combustion of the fuel containing the sulfur component and the ammonia fuel.

In addition, in the boiler 1 of the present embodiment, as the wall parts, the furnace 2 includes the front wall 2b where the burner is installed, the rear wall 2c where the burner 4 is installed and which is disposed to face the front wall 2b, and the side wall 2d that connects the front wall 2b and the rear wall 2c to each other and where the burner 4 is not installed, the ammonia injection ports 2f are provided on both the front wall 2b and the rear wall 2c, and the ammonia injection port 2f is disposed closer to the side wall 2d than the burner 4 in the horizontal direction. Therefore, it is possible to reliably form a region having the high concentration of OH radicals between the flame formed by the burner 4 and the side wall 2d, and it is possible to more reliably suppress the corrosion of the side wall 2d.

In addition, in the boiler 1 of the present embodiment, the ammonia injection port 2f injects the ammonia in the direction in which the burner 4 injects the fuel. Therefore, it is possible to prevent a flow of the ammonia injected from the ammonia injection port 2f from intersecting with a flow of the fuel injected from the burner 4, and it is possible to prevent the flow of the fuel injected from the burner 4 from being obstructed by the ammonia injected from the ammonia injection port 2f.

Second Embodiment

Next, a second embodiment of the present disclosure will be described. In the description of the present embodiment, the same elements as those of the first embodiment will be omitted or simplified in the description.

Figure 3:
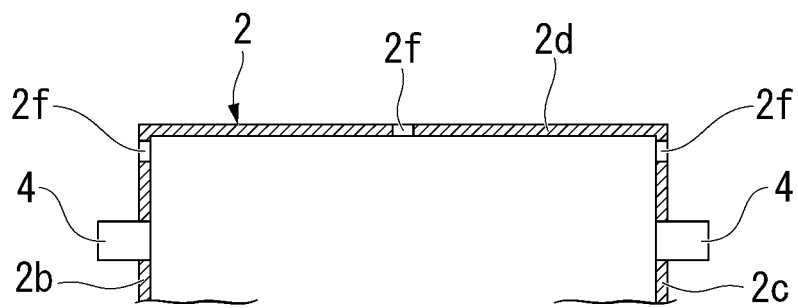
FIG. 3 is a plan sectional view including a side wall of a furnace included in a boiler according to a second embodiment of the present disclosure.

FIG. 3 is a plan sectional view including the side wall 2d of the furnace 2 included in a boiler of the present embodiment. As illustrated in FIG. 3, in the present embodiment, the ammonia injection port 2f is also installed on the side wall 2d in addition to the front wall 2b and the rear wall 2c. The ammonia injection port 2f installed on the side wall 2d is disposed in a substantially central part in the horizontal direction (forward-rearward direction) which connects the front wall 2b and the rear wall 2c to each other, and injects the ammonia along the inner wall surface of the side wall 2d at a gentle flow velocity.

The central part in the forward-rearward direction is located far from the ammonia injection ports 2f provided on the front wall 2b and the rear wall 2c. Therefore, there is a possibility that the ammonia injected from the ammonia injection ports 2f provided on the front wall 2b and the rear wall 2c may not reach the central part in the forward-rearward direction. As the ammonia injection port 2f is installed on the side wall 2d in the present embodiment, the ammonia can flow along a wider range of the inner wall surface of the side wall 2d, and it is possible to prevent the side wall 2d from being corroded in a wider range. Therefore, according to the boiler of the present embodiment, as the ammonia injection port 2f is provided on the side wall 2d, it is possible to prevent the side wall 2d from being corroded in a wider range.

Third Embodiment

Next, a third embodiment of the present disclosure will be described. In the description of the present embodiment, the same elements as those of the first embodiment will be omitted or simplified in the description.

Figure 4:
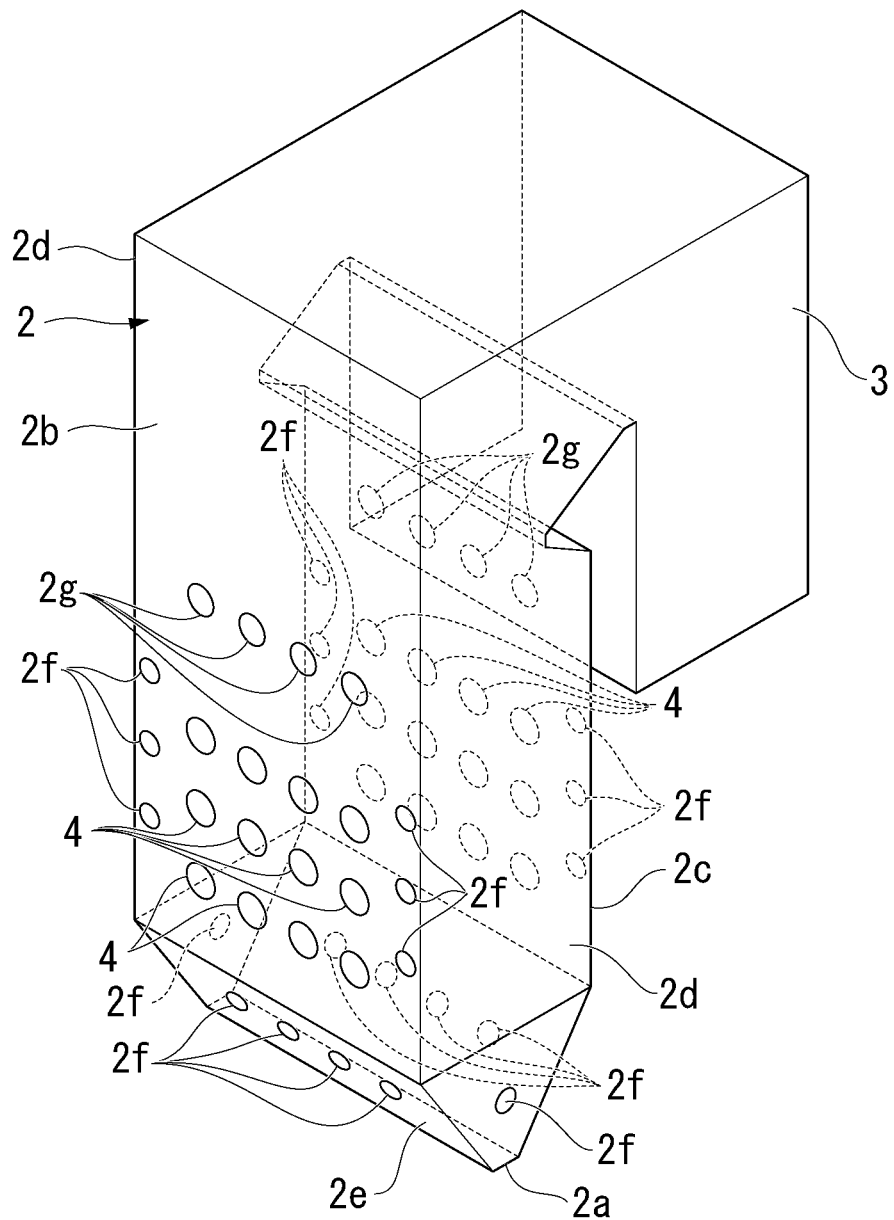
FIG. 4 is a schematic perspective view including a furnace for showing a disposition of a burner and an ammonia injection port which are included in a boiler according to a third embodiment of the present disclosure.

FIG. 4 is a schematic perspective view including the furnace 2 for showing a disposition of the burners 4 and the ammonia injection ports 2f in a boiler of the present embodiment. As illustrated in FIG. 4, in the present embodiment, a plurality of the ammonia injection ports 2f are provided on the hopper wall 2e where the burner 4 is not installed. The ammonia injection port 2f provided on the hopper wall 2e injects the ammonia along an inner wall surface of the hopper wall 2e.

According to the boiler of the present embodiment, the ammonia injected from the ammonia injection port 2f provided on the hopper wall 2e flows along the inner wall surface of the hopper wall 2e, and is burned in the vicinity of the inner wall surface of the hopper wall 2e, thereby forming a region having the high concentration of OH radicals in the vicinity of the inner wall surface of the hopper wall 2e. Therefore, the oxidation reaction of the hydrogen sulfide is promoted in the vicinity of the inner wall surface of the hopper wall 2e, and it is possible to suppress corrosion of the hopper wall 2e. As described above, according to the boiler of the present embodiment, it is possible to prevent not only the side wall 2d but also the hopper wall 2e from being corroded due to the hydrogen sulfide.

Hereinbefore, although embodiments of the present disclosure is described with reference to the attached drawings, the present disclosure is not limited to the above embodiments. The shape, the combination or the like of each component shown in the above embodiment is an example, and various modifications of a configuration based on a design request or the like can be adopted within the scope of the present disclosure.

For example, in the first embodiment and the third embodiment, as illustrated in FIGS. 2 and 4, a configuration is adopted in which another ammonia injection port 2f is not installed between the ammonia injection ports 2f disposed at the same height. However, the present disclosure is not limited thereto. For example, in a case where it is necessary to further improve corrosion resistance of the front wall 2b and the rear wall 2c, one or more ammonia injection ports 2f may be disposed between the ammonia injection ports 2f disposed at the same height.

In addition, in the above-described embodiment, an example has been described in which the present disclosure is applied to an opposed combustion boiler where the burners 4 are installed on the front wall 2b and the rear wall 2c of the furnace 2. However, without being limited thereto, the present disclosure may be applied to a circulation combustion type boiler as long as a boiler includes a furnace having a wall part where the burner is not installed.

In addition, in the above-described embodiment, a configuration is adopted in which the two-stage combustion air is supplied to the upper part of the furnace 2. However, the present disclosure may be applied to a boiler which does not supply the two-stage combustion air.

In addition, in the above-described embodiment, the boiler which performs mixed-fuel combustion of the pulverized coal and the ammonia as a fuel has been described. However, the present disclosure is not limited thereto. For example, a configuration may be adopted in which mixed-fuel combustion of natural gas and ammonia is performed, or a configuration may be adopted in which mixed-fuel combustion of heavy oil or light oil and ammonia is performed. That is, the present disclosure is applicable to a boiler which performs mixed-fuel combustion of a sulfur-containing fuel and ammonia.

The present disclosure is applicable to a boiler which performs mixed-fuel combustion of a fuel containing a sulfur component and an ammonia fuel.

What is claimed is:

1. A boiler which performs mixed-fuel combustion of a sulfur-containing fuel and ammonia, the boiler comprising:
    a furnace having a plurality of wall parts;
    a burner installed on at least one of the wall parts of the furnace and configured to inject into the furnace and burn the sulfur-containing fuel and a first portion of the ammonia; and
    an ammonia injection port that is configured to cause a second portion of the ammonia to flow and be burned along an inner wall surface of the wall part.

2. The boiler according to claim 1,
    wherein the wall parts of the furnace include
        a front wall on which the burner is installed,
        a rear wall on which the burner is installed, and which is disposed to face the front wall, and a side wall which connects the front wall and the rear wall to each other, and on which the burner is not installed, and the ammonia injection port is provided on at least one of the front wall and the rear wall, and disposed closer to the side wall than the burner in a horizontal direction.

3. The boiler according to claim 2, wherein the ammonia injection port is configured to inject the first portion of the ammonia in a direction in which the burner injects the sulfur-containing fuel and the second portion of the ammonia.

4. The boiler according to claim 2, wherein the ammonia injection port is further installed on the side wall, in addition to the at least one of the front wall and the rear wall.

5. The boiler according to claim 1, wherein the wall parts of the furnace include a hopper wall that is narrowed toward a discharge port through which ash is discharged outward, and the ammonia injection port is configured to cause the second portion of the ammonia to flow along an inner wall surface of the hopper wall.

* * * * *